(12) United States Patent
Younessian et al.

(10) Patent No.: US 11,954,141 B1
(45) Date of Patent: Apr. 9, 2024

(54) SYSTEMS AND METHODS FOR AD-HOC EVENT DETECTION IN CONTENT

(71) Applicant: Comcast Cable Communications, LLC, Philadelphia, PA (US)

(72) Inventors: Ehsan Younessian, Washington, DC (US); Nina Mortazavi, Washington, DC (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 18/153,698

(22) Filed: Jan. 12, 2023

(51) Int. Cl.
*G06F 7/00* (2006.01)
*G06F 16/435* (2019.01)
*G06F 16/45* (2019.01)

(52) U.S. Cl.
CPC ............ *G06F 16/435* (2019.01); *G06F 16/45* (2019.01)

(58) Field of Classification Search
CPC ...... G06F 16/435; G06F 16/45; G06F 16/248; G06F 16/955; G06F 16/3322; G06F 16/583; G06F 16/55; G06F 16/54; G06F 16/5838; G06F 16/50; G06F 18/22; G06F 18/2323; G06F 18/28; G06F 18/5838; G06F 18/23; G06F 2212/455; G06F 2212/464

See application file for complete search history.

(56) References Cited

U.S. PATENT DOCUMENTS

| | | | |
|---|---|---|---|
| 9,652,695 B2 * | 5/2017 | Bengio | G06N 7/01 |
| 11,074,477 B2 * | 7/2021 | Sawhney | G06F 18/22 |
| 2020/0013265 A1 * | 1/2020 | Moloney | G08B 13/19682 |
| 2020/0226128 A1 * | 7/2020 | Ma | G06F 16/248 |
| 2021/0224545 A1 * | 7/2021 | Shah | H04N 5/772 |

* cited by examiner

*Primary Examiner* — Mohammad A Sana
(74) *Attorney, Agent, or Firm* — BakerHostetler (57) ABSTRACT

Event detection may be carried out to determine one or more content items associated with an event type. A server may determine one or more visually relevant labels, of a plurality of labels, associated with the event type. The server may determine one or more textually relevant labels, of the plurality of labels, associated with the event type. The server may determine an event label distribution based on a correlation of the visually relevant event labels and the textually relevant labels, wherein the event label distribution comprises a plurality of labels. The server may determine a content item label distribution associated with a content item, wherein the content item label distribution comprises a plurality of second labels. The server may send, based on comparing the event label distribution with the content item label distribution, the content item to a computing device.

22 Claims, 6 Drawing Sheets

SYSTEMS AND METHODS FOR AD-HOC EVENT DETECTION IN CONTENT

BACKGROUND

Automatic detection and recognition of objects and events in content, such as multimedia content or video content, is rapidly developing. Users may provide a query to search for a specific type of event. An automatic detection and recognition system may return a result related to the query. However, models used to train automatic detection and recognition systems typically require large quantities of training data, time, and resource expenditures to reach acceptable efficiency and accuracy levels. The training may be prohibitively expensive from a resource consumption perspective. Improvements in training an automatic detection and recognition system are needed.

SUMMARY

In order to provide improved detection of events and objects in content, a system may create an event label distribution for a plurality of events. The system may initially create a limited number of semantic labels that may be used to detect objects associated with any type of semantic event. The system may create the event label distribution using a textually based label distribution or a visually based label distribution. The event label distribution may be a combination of the textually based label distribution and the visually based label distribution. Content, such as multimedia content, may be analyzed by the system to determine a test label distribution for the multimedia content. The test label distribution may comprise a plurality of event labels associated with the multimedia content. The event label distribution and the test label distribution may be compared. The system may determine, based on the comparison, a relevance score of the event label distribution and the test label distribution. Based on the relevance score reaching a threshold, the multimedia content associated with the test label distribution may be determined to be associated with the event type. Thus, the detection of events and objects may be performed in an ad-hoc manner according to the recitations described herein.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of the disclosure.

BRIEF DESCRIPTION OF THE DRAWINGS

Aspects of the disclosure will now be described in detail with reference to the drawings, wherein like reference numbers refer to like elements throughout, unless specified otherwise.

DETAILED DESCRIPTION

In order to provide improved detection of events and objects in content, a system may create an event label distribution for a plurality of events. The system may initially create a limited number of semantic labels that may be used to detect objects associated with any type of semantic event. The system may create the event label distribution using a textually based label distribution or a visually based label distribution. The event label distribution may be a combination of the textually based label distribution and the visually based label distribution. Content, such as multimedia content, may be analyzed by the system to determine a test label distribution for the multimedia content. The test label distribution may comprise a plurality of event labels associated with the multimedia content. The event label distribution and the test label distribution may be compared. The system may determine, based on the comparison, a relevance score of the event label distribution and the test label distribution. Based on the relevance score reaching a threshold, the multimedia content associated with the test label distribution may be determined to be associated with the event type. Thus, the detection of events and objects may be performed in an ad-hoc manner according to the recitations described herein.

In a system for event detection in content, in which event label distributions for a plurality of event types have been determined as discussed above, a desired event type may be queried. The queried event type may be processed by the disclosed systems herein to determine one or more pieces of content associated with the event type. For example, the event type may comprise one or more words or one or more phrases. A visual analysis of objects associated with one or more images associated with the event type may determine one or more visually relevant labels associated with the event type. A textual analysis of the event type may determine one or more textually relevant labels associated with the event type. A combination, or correlation for example, of the visually relevant labels and the textually relevant labels may determine an event label distribution associated with the event type. A comparison may be made between the event label distribution and an example label distribution associated with an example content item. A relevance may be determined based on the comparison.

Use of this event detection method may provide for additional labels associated with content items. The additional labels may be retained as metadata associated with the content items and associated with events requested by a user. Using the generated metadata, the system can more directly present content items of likely interest to the requesting user. Additionally, determining events present in a content item may provide for improved methods of presenting other content items with similar events. For example, advertisements presented in association with a content item may be tailored to the types of events present in the content item. Furthermore, content items with associated event labels may be indexed by those labels. Thus, users may be able to navigate to specific content of interest merely more easily by requesting content associated with one or more event labels.

Figure 1:
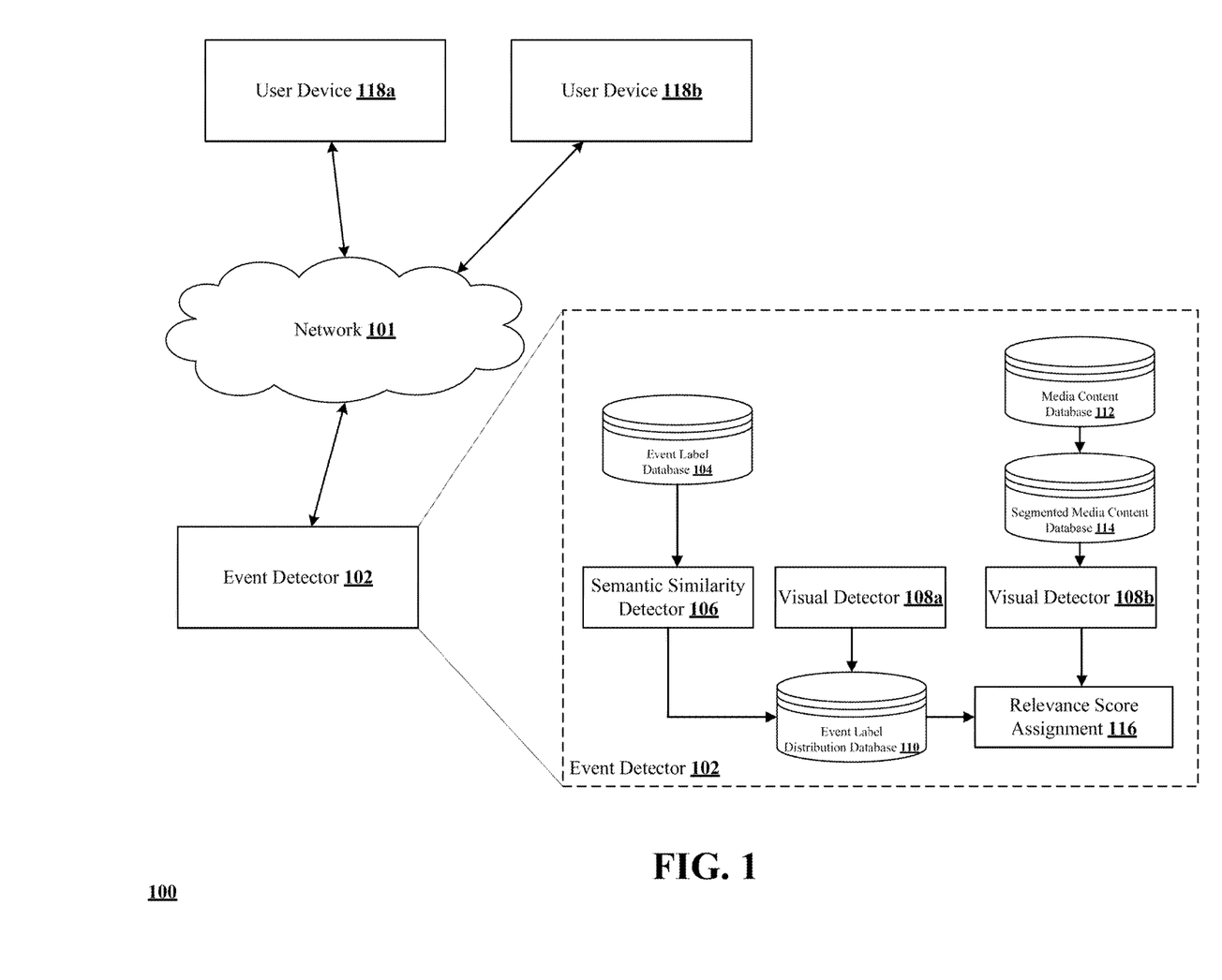
FIG. 1 shows an example system.

FIG. 1 shows an example system 100 in which the systems, methods, and apparatuses disclosed herein may be implemented. As shown in FIG. 1, the system 100 may comprise at least one user device, such as user device 118*a* or user device 118*b*. The user devices 118*a* and 118*b* may comprise, as non-limiting examples, a computer, a laptop, a tablet, a mobile phone, a personal digital assistant (PDA), or the like. The user devices may be in communication with a network 101.

The network 101 may comprise one or more of an internet service provider (ISP) network, a cloud computing network, a local area network (LAN), a Wi-Fi network, a wide area network (WAN), a satellite network, the internet, or any combination thereof. The network 101 may facilitate communication among multiple entities. For example, the user device 118a may communicate with the event detector 102 via the network 101. Likewise, the user device 118b may communicate with the event detector 102 via the network 101. The user device 118a may communicate with the user device 118b via the network 101.

The event detector 102 may be located at a central location, such as a server associated with an internet service provider, for example. The event detector 102 may be located in a cloud computing environment. The event detector 102 may be located locally at a premises associated with the user device 118a or 118b. Though not shown in FIG. 1, the event detector 102 may be located on user device 118a or 118b, for example.

The event detector 102 may comprise multiple parts. For example, the event detector 102 may comprise one or more databases. For example, the event detector 102 may comprise an event label database 104, an event label distribution database 110, a media content database 112, or a segmented media content database 114, for example. Any one of the example databases may be configured as a separate database, or multiple databases may be configured at a same location. The event detector 102 may comprise multiple detectors. For example, the event detector 102 may comprise one or more of a semantic similarity detector 106 or a visual detector 108. The semantic similarity detector 106 may determine one or more event labels associated with one or more keywords. The visual detector 108 may determine one or more event labels associated with one or more images.

The event label database 104 may comprise a list of event labels. For example, the event labels may be any type of word, name, object, place, location, concept, emotion, or the like. Each event label may be pre-provisioned in the event label database 104. The event label database 104 may be updated to add or remove one or more event labels from the event label database 104. A larger number of event labels may provide a more extensive list of labels to compare to content when performing event label detection. A smaller number of event labels may decrease an amount of resources required to process an event label detection. Some or all of the event labels in the event label database 104 may be compared to an item of content when performing an event label detection. Some of the event labels stored in the event label database 104 may be associated with one or more visual cues. For example, an event label called "birthday party" may be associated with one or more visual cues, such as a cake, a candle, balloons, or the like. The visual cues may be determined during a visual detection, for example using visual detector 108a. The presence of one or more of the visual cues may indicate the presence of the associated event label. Additionally, or alternatively, the presence of each of the one or more visual cues may indicate the presence of the associated event label. Another event label may be called "wedding." For example, the "wedding" event label may be associated with one or more visual cues, such as a wedding dress, a tuxedo, flowers, or a cake.

A semantic similarity detector 106 may perform a semantic similarity operation on any number of events or event types. For example, a user may input a query, such as a word or an event, and the semantic similarity detector 106 may expand the query to detect one or more keywords associated with the query. For example, the semantic similarity detector 106 may detect one keyword, two keywords, five keywords, ten keywords, or any other number of keywords associated with the query. The semantic similarity detector 106 may determine a set number of keywords associated with a query. The semantic similarity detector 106 may determine a variable number of keywords associated with the query. The semantic similarity detector 106 may determine a variable number of keywords with a threshold similarity to the query. For example, the semantic similarity detector 106 may determine, using word embedding, a number of keywords with a threshold relation to the query.

The semantic similarity detector 106 may perform another operation on at least one of the one or more keywords. For example, the semantic similarity detector 106 may perform an operation on each one of the keywords to determine a similarity of a keyword to an event query. The semantic similarity detector 106 may compare each of the keywords to one event label. The semantic similarity detector 106 may perform a word embedding operation to determine a relation between each keyword and the one event label. A relevance score may be determined for the event label based on a comparison of the relation between each keyword and the event label. An event label may, for example, also comprise a media analysis framework (mat) label. For example, the following formula may be used to determine a relevance score of an event label:

$$RelScoret(mafLabel_j, \text{event}) = \sum_{i=1}^{10} RelScore(kwi \mid \text{event}) * Sim(kwi, mafLabel_j)$$

for j=1, 2, . . . , n

In the above listed equation, the mafLabel$_j$ may comprise an event label, wherein j=1, 2, . . . , n represents n maf labels (e.g., n event labels). The event may comprise the event query input into the event detector 102. A "kwi" may be a keyword of the plurality of keywords, for example i=10 keywords. A "RelScore" may represent a relevance score determined based on the semantic similarity operation performed by the semantic similarity detector 106. Thus, a relevance score for each maf label (e.g., event label) may be calculated based, for example, a product of a relevance score between a keyword and an event, and a similarity between a keyword and a maf label.

A visual detector 108a may perform a visual detection of an event query to determine visually relevant maf labels for the event query. For example, the visual detector 108a may pass the event query through an image or video search engine, such as any image or video search engine known in the art. The image or video search engine may return a plurality of image or video results determined based on parameters determined by the particular image or video search engine. A number of the top-ranked results may be further processed. For example, the visual detector 108a may process the top ten, the top 25, the top 50, the top 100, or any other number of top-ranked results from the image or video search engine.

The visual detector 108a may perform the further processing by, for example, the following relationship:

$$RelScorev(mafLabel_j, \text{event}) = \sum_{i=1}^{100} confScore(maflabel, \text{image}_i)$$

The visual detector 108a may determine a confidence score (e.g., a "confScore") associated with a maf Label$_j$ (e.g., an event label) and one result from the image or video search engine. For example, the visual detector 108a may determine a confidence score that a first event label is associated with a first image. The visual detector 108a may determine individual confidence scores for the first event label across each of the top-ranked results from the image or video search engine. The visual detector 108a may determine, based on an aggregation of the confidence scores for the first event label across each of the top-ranked results, a relevance score. The relevance score may determine a likelihood and degree that an event label is associated with an event type.

The visual detector 108a may perform a similar operation with respect to a plurality of additional event labels. For example, visual detector 108a may determine a confidence score for a second event label compared with the first result of the image or video search engine. The visual detector 108a may determine a confidence score for the second event label in relation to each top-ranked result from the image or video search engine. The visual detector 108a may determine a relevance score for the second event label based on an aggregation of the confidence scores for the second event label associated with each of the top-ranked results. The visual detector 108a may repeat the process for each determined event label.

Furthermore, the visual detector 108a may determine a correlation between each of the determined event labels, using the following relationship:

$$RelScorev(mafLabel_j, event) = \sum_{i=1}^{100} \sum_{k=1}^{n} confScore(mafLabel_k, image_i) * corr(mafLabel_j, mafLabel_k)$$

N may represent the total number of event labels compared during the visual detector processing. The "corr(mafLabel$_j$,mafLabel$_k$)" may refer to a correlation between two of the event labels. For example, the operation may determine how often the two labels appear together in a single image from the image or video search engine. With the relevance score determined for each of the event labels, and with the correlation of each of the pairs of event labels, the system may determine a visual label distribution for an event type. For example, the visual label distribution may comprise a plurality of event labels, wherein each event label may be scaled based on a relevance score associated with each of the plurality of event labels. The visual event distribution may provide a way for the system to categorize, index, or otherwise label an event type.

The semantic similarity detector 106 and the visual detector 108a may perform textual and visual detection of a same event type. The output of the semantic similarity detector 106 and the visual detector 108a may be combined to determine a final event label distribution. For example, the final event label distribution may be a sum, a product, a correlation, a complex conjugation, or any other combination of the outputs of the semantic similarity detector 106 and the visual detector 108a. Additionally, either, neither, or both of the individual relevance scores of the semantic similarity detector 106 and the visual detector 108a may be scaled by any factor. For example, the output of the visual detector 108a, the visual event distribution, may be scaled down, scaled up, or not scaled at all, prior to combining the visual event distribution with the textual event distribution. The textual event distribution may be scaled down, scaled up, or not scaled at all, prior to combing the textual event distribution with the visual event distribution.

A media content database 112 may store media content for retrieval by the event detector 102. The media content database 112 may be stored locally at the event detector 102, as shown in FIG. 1. However, the media content database 112 may be stored remotely from the event detector 102, such as in a cloud computing storage location. In the case where the media content database 112 is stored remotely from the event detector 102, the media content database 112 and the event detector 102 may be in communication via the network 101. The media content database 112 may store items of media content. The segmented media content database 114 may comprise one or more pieces of media content stored at the media content database 112. However, the segmented media content database 114 may store the media content in a segmented form.

The visual detector 108b may process one or more segments of media content stored at the segmented media content database 114 to determine a visual event label distribution associated with the one or more segments of media content. A final event label distribution from the event label distribution database 110 may be compared to a visual event label distribution associated with the one or more segments of media content from the visual detector 108b to determine a relevance score between the final event label distribution and the visual event label distribution. For example, the comparison may be determined by the following relationship:

$$RelScore(testVideo_i, event) = \sum_{j=1}^{n} RelScorefinal(mafLabel_j, event) * RelScoret(mafLabel_j, testVideo_i) / \log(popularityScore(mafLabel_j))$$

The "testVideo$_i$" may represent an individual segment of media content. The relevance score of the individual segment of media content compared to an event may be scaled by a popularity score of an event label associated with the comparison. For example, the relevance of the individual segment of media content compared to the event may be scaled down for an event label that is relatively more popular, and the relevance of the individual segment of media content compared to the event may be scaled up for an event label that is relatively less popular. For example, an extremely popular event label may count less toward the final relevance score assignment 116. For example, a relatively popular event label may be present in many different types of unrelated media content items, so the presence of the relatively popular label in one media content item is less likely to comprise a uniquely identifying characteristic of the media content item.

Figure 2:
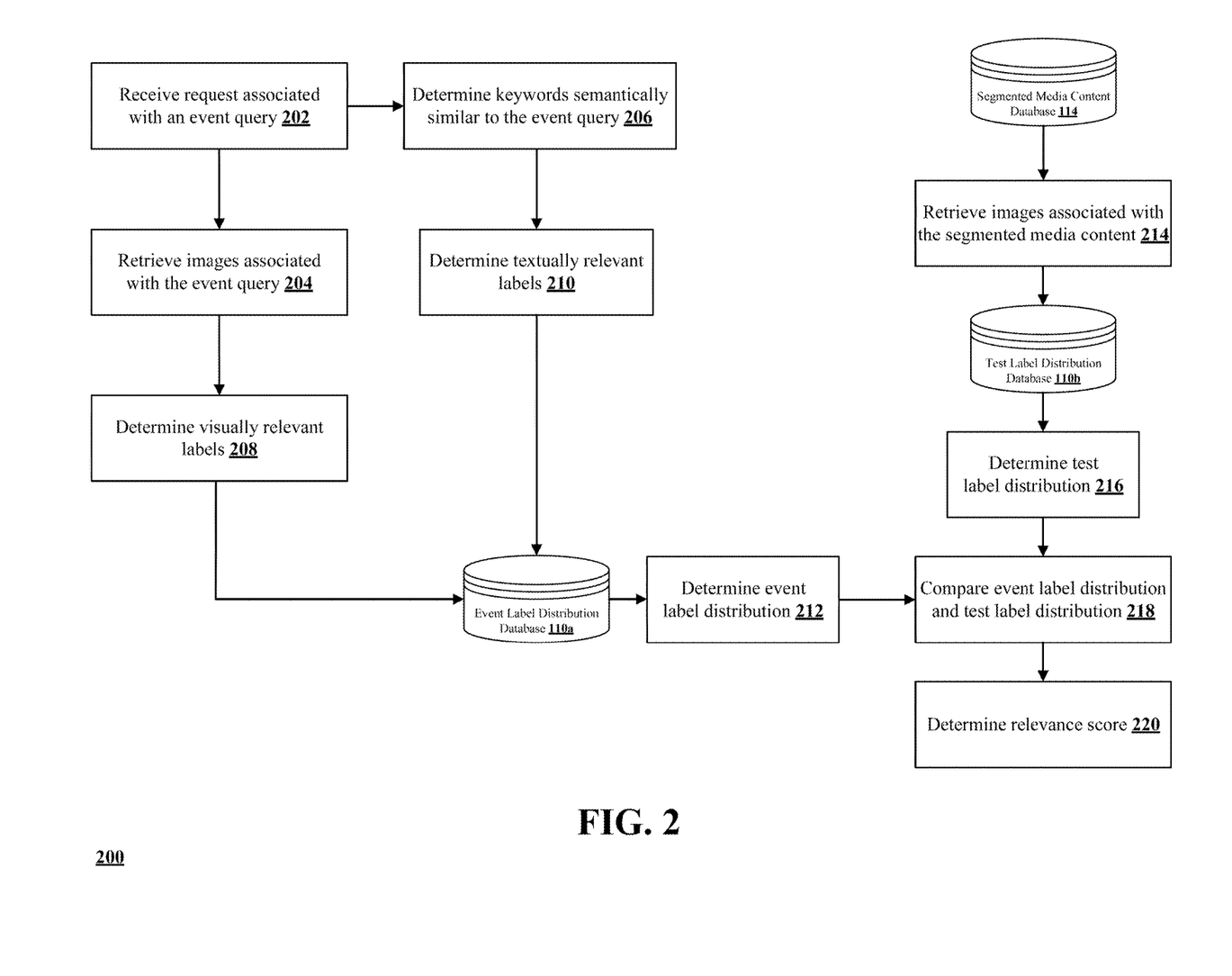
FIG. 2 shows an example system and method.

FIG. 2 shows an example method 200. The example method may be implemented, for example, in the system of FIG. 1. The method 200 may be used to facilitate event detection in content. The event detection may be ad-hoc. At step 202, a request may be received comprising an event query. The event query may comprise a word, a phrase, or a combination of words and phrases. At step 204, images associated with the event may be retrieved. For example, the event query may be passed through an image or video search engine. The image or video search engine may return a plurality of image or video results determined based on parameters determined by the particular image or video search engine. At step 208, a number of the top-ranked results may be further processed to determine visually relevant event labels. For example, the top ten, the top 25, the top 50, the top 100, or any other number of top-ranked results from the image or video search engine may be processed further to determine visually relevant event labels. The further processing may be determined, for example, in accordance with the following relationship:

$$RelScore(mafLabel_j, event) = \sum_{i=1}^{100} confScore(mafLabel, image_i),$$

A confidence score (e.g., a "confScore") may be determined between an event label (e.g., a "mafLabel$_j$") and an image from the search engine. For example, a visual detector may determine a confidence score associated with a first event label and a first image from the search engine. The visual detector may determine another confidence score associated with the first event label and a second image from the search engine. The visual detector may determine a plurality of additional confidence scores associated with the first event label and a plurality of additional images from the search engine. The visual detector may aggregate a plurality of the confidence scores associated with the first event label to determine a relevance score associated with the first event label. Thus, for a first event label associated with an event query, a relevance score can be computed. The visual detector may run the same process associated with a second event label. In particular, the visual detector may determine a confidence score associated with the second event label and the first image. The visual detector may determine a confidence score associated with the second event label and the second image. The visual detector may determine a plurality of confidence scores between the second event label and a plurality of images. The visual detector may aggregate the confidence scores associated with the second event label to determine a relevance score between the second event label and the event query. The visual detector may repeat the same process with any number of event labels, including repeating the process with each event label stored in an event label database. The correlation may be determined based on the following relationship:

$$RelScore(mafLabel_j, event) =$$
$$\sum_{i=1}^{100}\sum_{k=1}^{n} confScore(mafLabel_k, image_i) * corr(mafLabel_j, mafLabel_k)$$

N may represent the total number of event labels compared during the visual detector processing. The "corr(mafLabel$_j$,mafLabel$_k$)" may refer to a correlation between two of the event labels. For example, the operation may determine how often the two labels appear together in a single image from the image or video search engine. With the relevance score determined for each of the event labels, and with the correlation of each of the pairs of event labels, the system may determine a visual label distribution for an event type. For example, the visual label distribution may comprise a plurality of event labels, wherein each event label may be scaled based on a relevance score associated with each of the plurality of event labels. The visual event distribution may provide a way for the system to categorize, index, or otherwise label an event type.

In parallel, or separately, the received request associated with the event 202 may be processed by a textual detector. For example, in step 206, the event query may be processed by a textual detector to determine a semantic similarity of a number of keywords most closely related to the event query. For example, the textual detector may determine ten keywords that are semantically similar to the event query. The semantic similarity may be determined by any process known in the art. For example, the semantic similarity may be determined via word embedding, though the process is not so limited. The number of keywords, for example ten keywords, may be associated with the event query as a first order expansion of textually relevant terms to the event query.

At step 210 the textual detector may further process the keywords to determine a second order of semantic similarity between the keywords and one or more of the event labels. The textual detector may compare each of the keywords against each of the event labels, or the textual detector may compare each of the keywords against a number of event labels less than every event label. For example, the keywords and the event labels may be compared using the following relationship:

$$RelScoret(mafLabel_j, event) =$$
$$\sum_{i=1}^{10} RelScore(kwi \mid event) * Sim(kwi, mafLabel_j) \text{ for } j = 1, 2, \ldots, n$$

In the above listed equation, the mafLabel$_j$ may comprise an event label, wherein j=1, 2, n represents n maf labels (e.g., n event labels). The event may comprise the received event query 202. A "kwi" may be a keyword of the plurality of keywords, for example i=10 keywords. A "RelScore" may represent a relevance score determined based on the semantic similarity operation performed by the textual detector. Thus, a relevance score for each maf label (e.g., event label) may be calculated based, for example, a product of a relevance score between a keyword and an event, and a similarity between a keyword and an event label. The textual detector, or another component of an event detector system, may determine a threshold relevance. The system may filter out any event labels that have a relevance score lower than the threshold relevance. Accordingly, the system may determine a curated list of event labels with relevance scores related to the event query, while removing event labels from the group that are not sufficiently relevant to the event query.

The visual detector may determine visually relevant event labels at step 208, and the textual detector may determine textually relevant event labels at step 210, and both sets of event labels may be associated with one another in an event label distribution database 110a.

The visual detector and the textual detector may perform visual and textual detection of a same event query. The output of the visual detector and the textual detector may be combined to determine a final event label distribution. For example, the final event label distribution may be a sum, a product, a correlation, a complex conjugation, or any other combination of the outputs of the visual detector and the textual detector. Additionally, either, neither, or both of the individual relevance scores of the visual detector and the textual detector may be scaled by any factor. For example, the output of the visual detector (e.g., the visual event distribution) may be scaled down, scaled up, or not scaled at all, prior to combining the visual event label distribution with the textual event label distribution. The textual event label distribution may be scaled down, scaled up, or not scaled at all, prior to combing the textual event label distribution with the visual event label distribution. At step 212, the final event label distribution may be determined.

Alternatively, or in parallel, a segmented media content database 114 may store segments of media content for retrieval. At step 214, images from the segmented media content database may be retrieved for processing in the ad-hoc event detection system. The images from the segmented media content may be processed to determine a test label distribution. The test label distribution may be determined using a visual detector similar to, or the same as, the visual detector used to determine the visual event label distribution.

At step 216, the visual detector may perform a visual detection of segmented media content to determine visually relevant event labels for the segmented media content. For example, the visual detector may pass the segmented media content through an image or video search engine, such as any image or video search engine known in the art. The image or video search engine may return a plurality of image or video results determined based on parameters determined by the particular image or video search engine. A number of the top-ranked results may be further processed. For example, the visual detector may process the top ten, the top 25, the top 50, the top 100, or any other number of results from the image or video search engine.

The visual detector may perform the further processing by, for example, the following relationship:

$$RelScorev(mafLabel_j, \text{event}) = \sum_{i=1}^{100} confScore(mafLabel_j, image_i)$$

The visual detector may determine a confidence score (e.g., a "confScore") associated with a test label (e.g., a mafLabel$_j$) and one result from the image or video search engine. For example, the visual detector may determine a confidence score that a first test label is associated with a first image of the segmented media content. The visual detector may determine individual confidence scores for the first test label across each of the top-ranked results from the image or video search engine. The visual detector may determine, based on an aggregation of the confidence scores for the first test label across each of the top-ranked results, a relevance score. The relevance score may determine a likelihood and degree that a test label is associated with a piece of segmented media content.

The visual detector may perform a similar operation with respect to a plurality of additional test labels. For example, visual detector may determine a confidence score for a second test label compared with the first segmented media content of the image or video search engine. The visual detector may determine a confidence score for the second test label in relation to each top-ranked result of the segmented media content from the image or video search engine. The visual detector may determine a relevance score for the second test label based on an aggregation of the confidence scores for the second test label associated with each of the top-ranked results. The visual detector may repeat the process for each determined test label.

Furthermore, the visual detector may determine a correlation between each of the determined test labels, using the following relationship:

$$RelScorev(mafLabel_j, \text{event}) =$$
$$\sum_{i=1}^{100} \sum_{k=1}^{n} confScore(mafLabel_k, image_i) * corr(mafLabel_j, mafLabel_k)$$

N may represent the total number of test labels compared during the visual detector processing. The "corr(mafLabel$_j$, mafLabel$_k$)" may refer to a correlation between two of the test labels. For example, the operation may determine how often the two test labels appear together in a single image from the segmented media content. With the relevance score determined for each of the test labels, and with the correlation of each of the pairs of test labels, the system may determine a test label distribution for a segmented media content item. For example, the test label distribution may comprise a plurality of test labels, wherein each test label may be scaled based on a relevance score associated with each of the plurality of test labels. The test label distribution may provide a way for the system to categorize, index, or otherwise label an event type.

At step 218, the event label distribution determined at step 212 and the test label distribution determined at step 216 may be compared to determine a relevance score 220 between the event label distribution and the test label distribution. For example, the comparison may be determined by the following relationship:

$$RelScore(testVideo_i, \text{event}) = \sum_{j=1}^{n} RelScorefinal(mafLabel_j, \text{event}) *$$
$$RelScoret(mafLabel_j, testVideo_i) / \log(popularityScore(mafLabel_j))$$

The "testVideo$_i$" may represent an individual segment of media content. The relevance score of the individual segment of media content compared to an event query may be scaled by a popularity score of an event label associated with the comparison. For example, the relevance of the individual segment of media content compared to the event may be scaled down for an event label that is relatively more popular, and the relevance of the individual segment of media content compared to the event may be scaled up for an event label that is relatively less popular, however, the scaling is not so limited. For example, an extremely popular event label may count less toward the final relevance score assignment 116. For example, a relatively popular event label may be present in many different types of unrelated media content items, so the presence of the relatively popular label in one media content item is less likely to comprise a uniquely identifying characteristic of the media content item.

Figure 3:
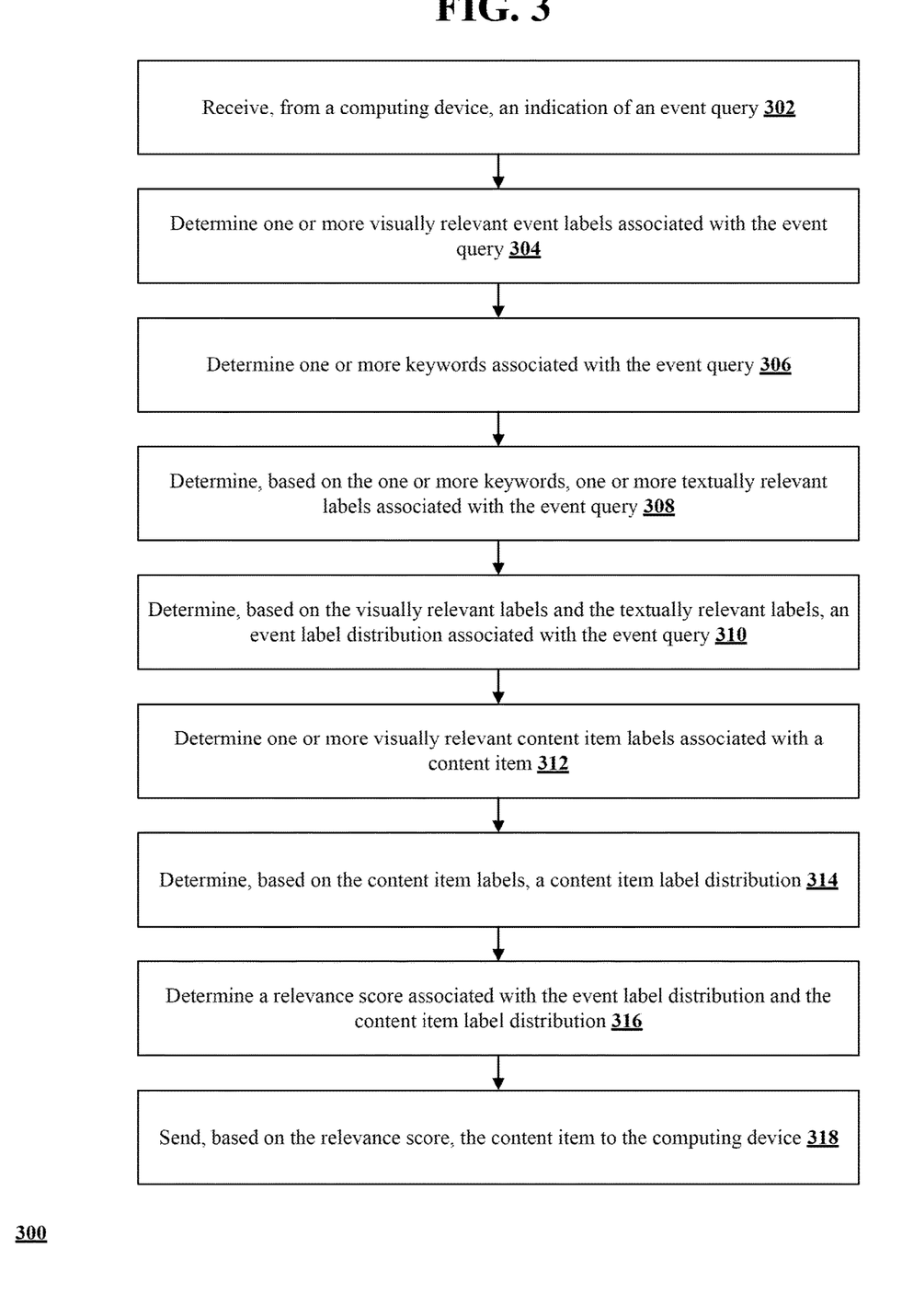
FIG. 3 shows an example method.

FIG. 3 shows an example method. The method of FIG. 3 may be used in an event detection system, such as the system 100 illustrated in FIG. 1. The method of FIG. 3 may take place at least in part in an event detector, such as event detector 102, of FIG. 1. The method of FIG. 3 may take place at a user device, such as user device 118*a* of FIG. 1, associated with an event query. The method of FIG. 3 may take place at a remote location, such as a server or a cloud computing system associated with an internet service provider, or the like.

At step 302, a system, such as the system 100 illustrated in FIG. 1, may receive, from a computing device, an indication of an event query (e.g., an event type). The event query may be a word, a phrase, or a combination of a word and a phrase. The word or the phrase may describe an event. The computing device may be a user device, such as user device 118*a* and user device 118*b*.

At step 304, the system may determine one or more visually relevant event labels associated with the event query. For example, a visual detector may run the event query through an image or video search engine. The visual detector may determine a number of images returned by the image or video search engine to process further. The visual detector may determine a relevance score of one or more event labels associated with each of the images determined for further processing. The visual detector may determine a confidence score associated with a correlation between an event label and one image of the number of images, and the visual detector may aggregate each of the confidence scores associated with an event label to determine a relevance score of the event label and the event query. The visual detector may repeat the process for each event label to determine a relevance score for each event label based on the event query. The visual detector may aggregate each of the individual event label relevance scores to determine a visual event label distribution.

At step 306, the system may perform a query expansion to determine one or more keywords associated with the event query. For example, a textual detector may conduct a semantic similarity procedure, such as word embedding, of the event query to determine one or more keywords. At step 308, the system may determine, based on the one or more keywords, one or more textually relevant labels associated with the event query. Each keyword may be compared to each event label to determine a relevance score of the keyword and each event label. Based on a threshold relevance score, one or more of the textually relevant event labels may be filtered out of the group of textually relevant event labels. Based on the textually relevant event labels remaining, the system generates a textual event label distribution.

At step 310, the system determines, based on the visual event label distribution and the textual event label distribution, an overall event label distribution. The overall event label distribution may be based on a product, a sum, a correlation, or any other suitable operation, of the visual event label distribution and the textual event label distribution. Each, one, or neither of the visual event label distribution and the textual event label distribution may be scaled up or down to emphasize or de-emphasize the visual event label distribution or the textual event label distribution.

At step 312, the system determines one or more visually relevant content item labels associated with a content item. For example, the content item may be a segmented content item. For example, the content item may be a test video or a test content item. The system may process the content item with a visual detector to determine the visually relevant content item labels. For example, the visual detector may determine a confidence score associated with a first content item label and each frame of one or more key frames. The visual detector may determine a confidence score associated with a second content item label and each frame of the one or more key frames. The visual detector may repeat the process with any number of content item labels to determine any number of confidence scores. The visual detector may determine a relevance score associated with a content item label and the content item as an aggregate of the confidence scores associated with each of the any number of content item labels.

At step 314, the system determines, based on the visually relevant content item labels, a content item label distribution. The content item label distribution may comprise any number of content item labels, and each content item label may comprise a different relevance score compared to the content item. At step 316, the system may determine a relevance score associated with the event label distribution and the content item label distribution. The relevance score associated with the event label distribution and the content item label distribution may determine a similarity between the content item and the event query. The system may determine the relevance score associated with the event label distribution and the content item label distribution reaches a threshold value. Accordingly, at step 318, the system sends, based on the relevance score, the content item to the computing device.

Figure 4:
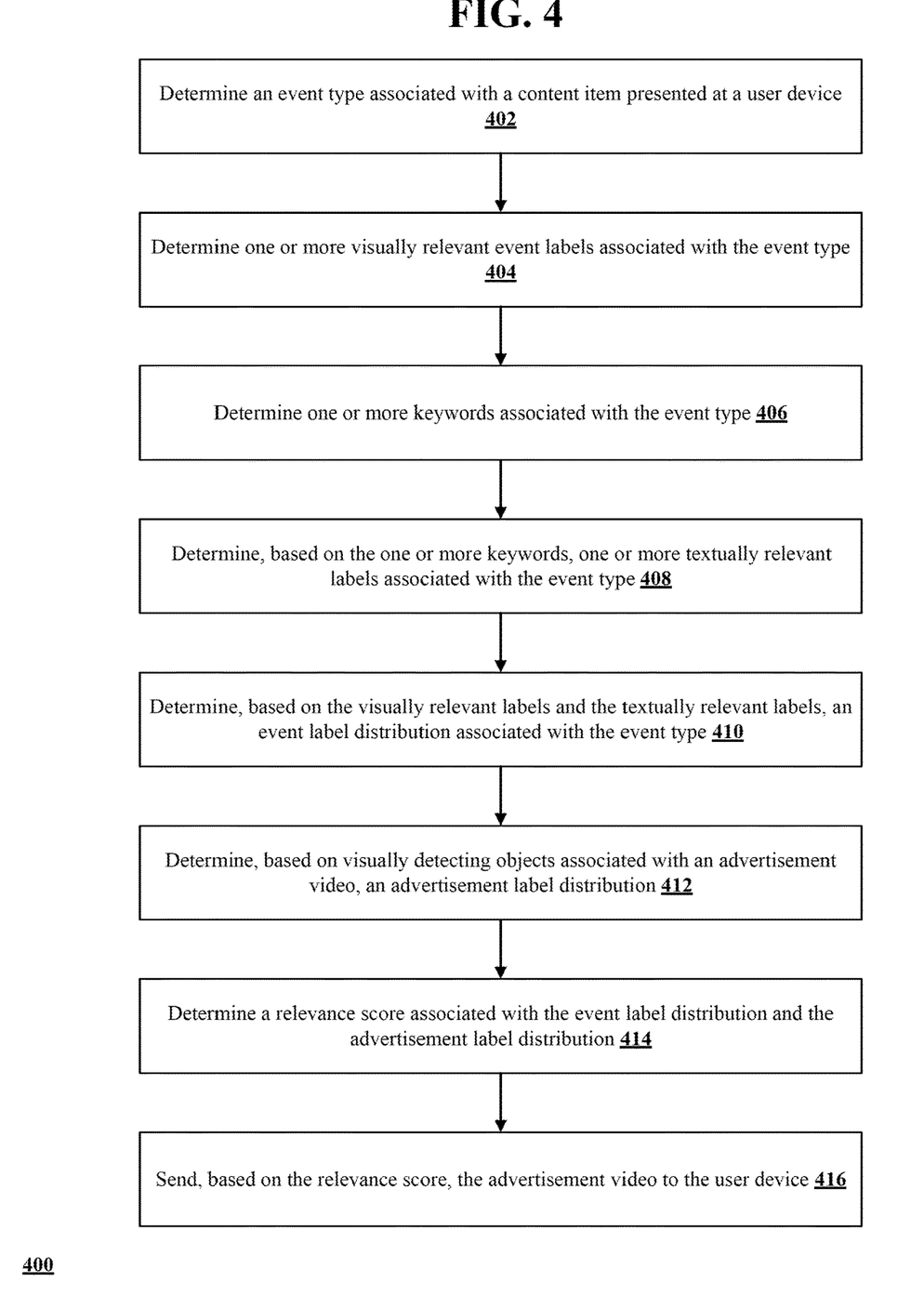
FIG. 4 shows an example method.

FIG. 4 shows an example method. The method of FIG. 4 may be used in an event detection system, such as the system 100 illustrated in FIG. 1. The method of FIG. 4 may take place at least in part in an event detector, such as event detector 102, of FIG. 1. The method of FIG. 4 may take place at a user device, such as user device 118a, of FIG. 1, associated with a content item. However, the method of FIG. 4 may take place at a remote location, such as a server or a cloud computing environment associated with an internet service provider, or the like.

At step 402, the event detector determines an event type associated with a content item presented at a user device. For example, the user device may be user device 118a or user device 118b. The content item may be an image presented at the user device, or the content item may be a video presented at the user device.

At step 404, the event detector determines one or more visually relevant event labels associated with the event type. For example, the event detector may be a visual detector, and the event detector may run the content item through an image or video search engine. The visual detector may determine a number of images returned by the image or video search engine to further process. The visual detector may determine a relevance score of one or more event labels associated with each of the number of images. The visual detector may determine a confidence score associated with a correlation between an event label and one image of the number of images, and the visual detector may aggregate each of the confidence scores associated with event labels to determine a relevance score of the event label and the content item. The visual detector may repeat the process for each event label to determine a relevance score for each event label based on the content item. The visual detector may aggregate each of the individual event label relevance scores to determine a visual event label distribution.

At step 406, the event detector may perform a query expansion to determine one or more keywords associated with the event type. For example, a textual detector may conduct a semantic similarity procedure, such as word embedding, of the event type to determine one or more keywords. At step 408, the event detector may determine, based on the one or more keywords, one or more textually relevant labels associated with the event type. Each keyword may be compared to each event label to determine a relevance score of the keyword and each event label. Based on a threshold relevance score, one or more of the textually relevant event labels may be filtered out of the group of textually relevant event labels. Based on the textually relevant event labels remaining, the system may generate a textual event label distribution.

At step 410, the event detector may determine, based on the visual event label distribution and the textual event label distribution, an overall event label distribution associated with the event type and the content item. The overall event label distribution may be based on a product, a sum, a correlation, or any other suitable operation, of the visual event label distribution and the textual event label distribution. Each, one, or neither of the visual event label distribution and the textual event label distribution may be scaled up or down to emphasize or de-emphasize the visual event label distribution or the textual event label distribution.

At step 412, the event detector determines one or more visually relevant content item labels associated with an advertisement video, wherein the advertisement video is stored in a content item database. For example, the advertisement video may be a segmented content item. The event detector may process the advertisement video with a visual detector to determine the visually relevant advertisement video labels. For example, the visual detector may determine a confidence score associated with a first advertisement video label and each frame of one or more key frames. The visual detector may determine a confidence score associated with a second advertisement video label and each frame of the one or more key frames. The visual detector may repeat the process with any number of advertisement video labels to determine any number of confidence scores. The visual detector may determine a relevance score associated with an advertisement video label and the advertisement video as an aggregate of the confidence scores associated with each of the any number of advertisement video labels.

At step 414, the event detector determines, based on the visually relevant advertisement video labels, an advertisement video label distribution. The advertisement video label distribution may comprise any number of advertisement video labels, and each advertisement video label may comprise a different relevance score when compared to the content item. At step 416, the system may determine a relevance score associated with the event label distribution and the advertisement video label distribution. The relevance score associated with the event label distribution and the advertisement video label distribution may determine a similarity between the content item and the advertisement video. The system may determine the relevance score associated with the event label distribution and the advertisement video label distribution exceeds a threshold value. Accordingly, the event detector sends, based on the relevance score, the advertisement video to the user device.

Figure 5:
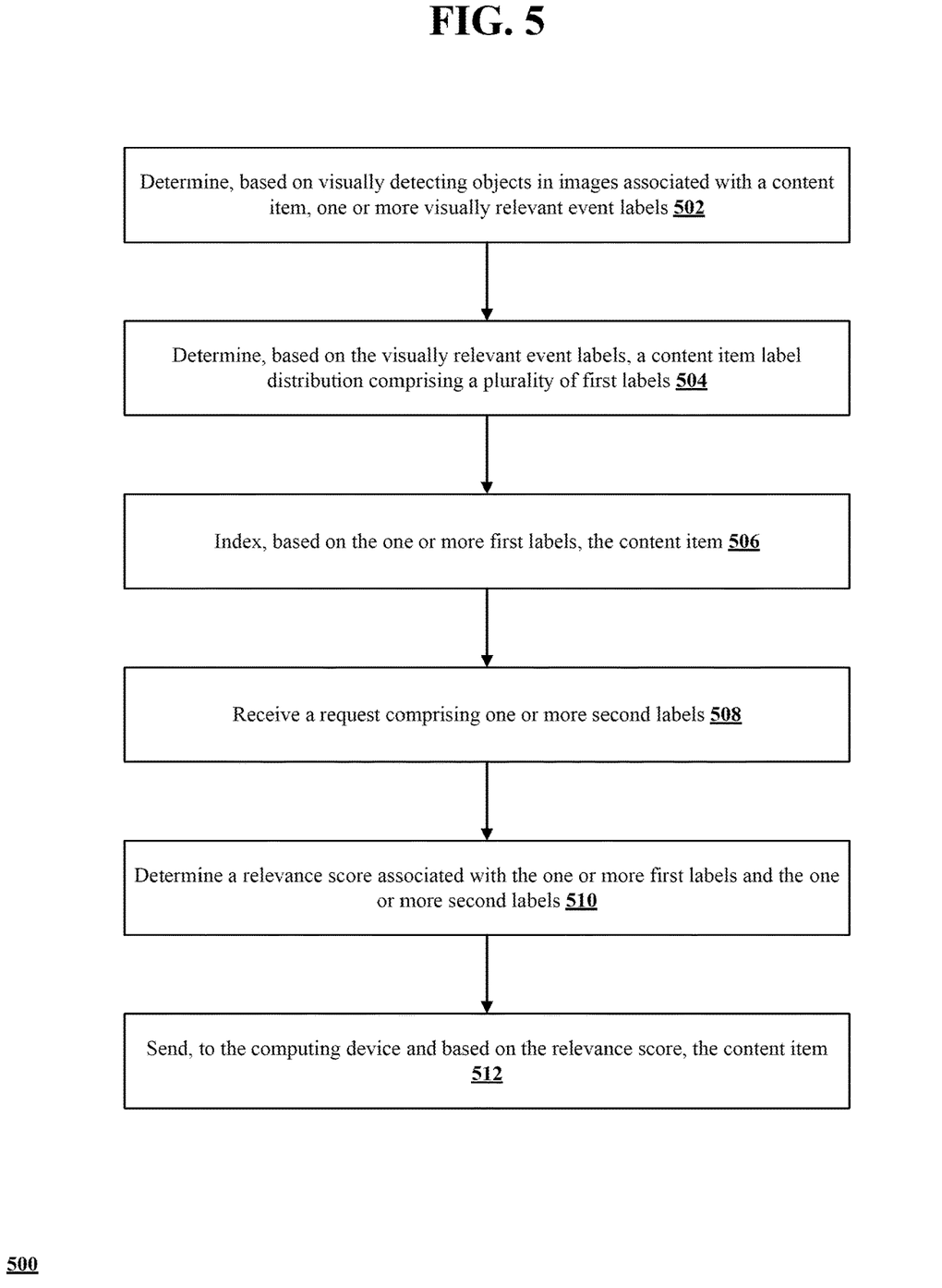
FIG. 5 shows an example method.

FIG. 5 shows an example method. The method of FIG. 5 may be used in an event detection system. The method of FIG. 5 may take place at least in part in an event detector, such as event detector 102, of FIG. 1. The method of FIG. 5 may take place at a user device, such as user device 118a, of FIG. 1, associated with an event query. However, the method of FIG. 5 may take place at a remote location, such as a server or a cloud computing environment associated with an internet service provider, or the like.

At step 502, the event detector determines, based on visually detecting objects in images associated with a content item, one or more visually relevant event labels. For example, the event detector may be a visual detector, and the event detector may run the content item through an image or video search engine. The visual detector may determine a number of images returned by the image or video search engine to further process. The visual detector may determine a relevance score of one or more event labels associated with each of the number of images. The visual detector may determine a confidence score associated with a correlation between an event label and one image of the number of images, and the visual detector may aggregate each of the confidence scores associated with event labels to determine a relevance score of the event label and the content item. The visual detector may repeat the process for each event label to determine a relevance score for each event label based on the content item. The visual detector may aggregate each of the individual event label relevance scores to determine a content item label distribution.

At step 504, the event detector may determine, based on the visually relevant event labels, a content item label distribution comprising a plurality of first labels. The plurality of first labels may comprise a plurality of event labels. The plurality of first labels may comprise a plurality of event labels exceeding a threshold relevance in relation to the content item.

At step 506, the event detector may index, based on the one or more first labels, the content item. For example, the event detector may determine, based on the relevance scores associated with each of the one or more first labels, a ranking of the one or more first labels based on the relevance scores associated with the content item. The content item may be indexed based on the most relevant first label. The content item may be indexed based on each of the one or more first labels. The content item may be indexed based on each of the one or more labels separately, or the content item may be indexed based on an average, or median, ranking of the one or more first labels' relevance scores.

At step 508, the event detector receives a request comprising one or more second labels. The request may comprise any number of labels of the event labels. The request may comprise the one or more second labels ranked in an order. The request may comprise the one or more second labels without an ordered ranking. The request may comprise one second label, two second labels, three second labels, or any other suitable number of second labels.

At step 510, the event detector determines a relevance score associated with the one or more first labels and the one or more second labels. For example, the event detector compares a relevance score between a first one of the one or more first labels with each of the one or more second labels. The event detector compares a second one of the one or more first labels with each of the one or more second labels. The event detector compares each one of the one or more first labels against each of the one or more second labels to determine individual relevance scores between each of the one or more first labels and each of the one or more second labels. The event detector determines an aggregate relevance score between the one or more first labels and the one or more second labels.

At step 512, the event detector sends, to the computing device and based on the relevance score, the content item. Based on the relevance score reaching a threshold value, the event detector determines a threshold similarity between the one or more second labels and the one or more first labels. Accordingly, the event detector determines the content item is a threshold similarity to the aggregate of the one or more second labels. Alternatively, the event detector determines, based on the relevance score being below a threshold similarity, to forego sending the content item to the computing device.

Figure 6:
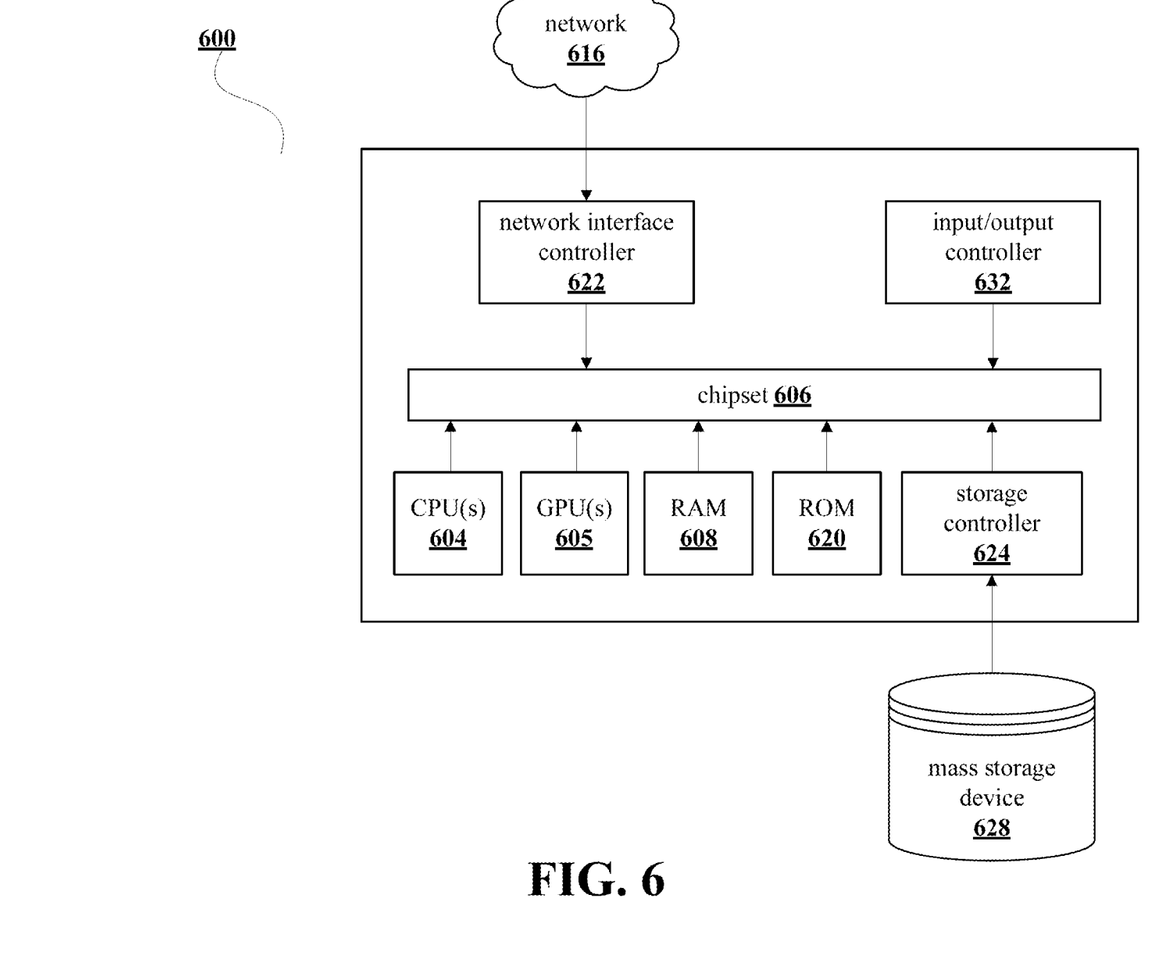
FIG. 6 shows an example computing system.

FIG. 6 shows an example computing device 600 that may represent any of the various devices or entities shown in FIG. 1, including, for example, the network 101, the user device 118, the event detector 102, or a database. That is, the computing device 600 shown in FIG. 6 may comprise any smartphone, server computer, workstation, access point, router, gateway, tablet computer, laptop computer, notebook computer, desktop computer, personal computer, network appliance, PDA, e-reader, user equipment (UE), mobile station, fixed or mobile subscriber unit, pager, wireless sensor, consumer electronics, or other computing device, and may be utilized to execute any aspects of the methods and apparatus described herein, such as to implement any of the apparatus of FIGS. 1 and 2 or any of the methods described in relation to FIGS. 3-5.

The computing device 600 may comprise a baseboard, or "motherboard," which is a printed circuit board to which a multitude of components or devices may be connected by way of a system bus or other electrical communication paths. One or more central processing units (CPUs or "processors") 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, or the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random-access memory (RAM) 608 used as the main memory in the computing device 600. The chipset 606 may provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems of the system 100. The chipset 606 may comprise functionality for providing network connectivity through a network interface controller (NIC) 622. A NIC 622 may be capable of connecting the computing device 600 to other computing nodes over the system 100. It should be appreciated that multiple NICs 622 may be present in the computing device 600, connecting the computing device to other types of networks and remote computer systems. The NIC 622 may be configured to implement a wired local area network technology, such as IEEE 802.3 ("Ethernet") or the like. The NIC 622 may also comprise any suitable wireless network interface controller capable of wirelessly connecting and communicating with other devices or computing nodes on the system 100. For example, the NIC 622 may operate in accordance with any of a variety of wireless communication protocols, including for example, the IEEE 802.11 ("Wi-Fi") protocol, the IEEE 802.16 or 802.20 ("WiMAX") protocols, the IEEE 802.15.4a ("Zigbee") protocol, the 802.15.3c ("UWB") protocol, or the like.

The computing device 600 may be connected to a mass storage device 628 that provides non-volatile storage (i.e., memory) for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 628 is characterized as primary or secondary storage or the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may read information from the mass storage device 628 by detecting the physical states or characteristics of one or more particular locations within the physical storage units.

In addition to the mass storage device 628 described herein, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may comprise volatile and non-volatile, non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other non-transitory medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described herein. The computing device 600 may have access to computer-readable storage media storing computer-executable instructions, which, when executed by the computing device 600, may perform the methods described in relation to FIGS. 3-5.

A computing device, such as the computing device 600 depicted in FIG. 6, may also comprise an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not comprise all of the components shown in FIG. 6, may comprise other components that are not explicitly shown in FIG. 6, or may utilize an architecture completely different than that shown in FIG. 6.

As described herein, a computing device may be a physical computing device, such as the computing device 600 of FIG. 6. A computing device may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems described herein are not limited to specific methods, specific components, or to particular implementations. It is also to be understood that the terminology used herein is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another example may comprise from the one particular value and/or to the other particular value. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of". "Such as" is not used in a restrictive sense, but for explanatory purposes.

Components and devices are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any combination of the described methods.

As will be appreciated by one skilled in the art, the methods and systems may take the form of entirely hardware, entirely software, or a combination of software and hardware aspects. Furthermore, the methods and systems may take the form of a computer program product on a computer-readable storage medium having computer-readable instructions (e.g., computer software or program code) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described above with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added or removed. The example systems and components described herein may be configured differently than described. For example, elements may be added to, removed from, or rearranged.

It will also be appreciated that various items are shown as being stored in memory or on storage while being used, and that these items or portions thereof may be transferred between memory and other storage devices for purposes of memory management and data integrity. Alternatively, some or all of the software modules and/or systems may execute in memory on another device and communicate with the shown computing systems via inter-computer communication. Furthermore, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms. Accordingly, the present invention may be practiced with other computer system configurations.

While the methods and systems have been described in connection with specific examples, it is not intended that the scope be limited to the specific examples set forth.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow and the plain meaning derived from grammatical organization or punctuation.

It will be apparent to those skilled in the art that various modifications and variations may be made without departing from the scope or spirit of the present disclosure. Alternatives will be apparent to those skilled in the art from consideration of the specification and practices described herein. It is intended that the specification and example figures be considered as exemplary only, with a true scope and spirit being indicated by the following claims.

What is claimed is:

1. A method comprising:
   receiving, from a user device, a query associated with an event type;
   determining, based on visually detecting one or more objects associated with one or more first images associated with the event type, one or more visual event labels, of a plurality of event labels, associated with the event type, wherein each one of the plurality of event labels may be associated with at least one of a visual event label or a textual event label;
   determining, based on one or more words associated with the query, one or more textual event labels, of the plurality of event labels, associated with the event type;
   determining, based on correlating the one or more visual event labels and the one or more textual event labels, an event label distribution associated with the event type, wherein the event label distribution comprises a plurality of first labels of the plurality of event labels;
   determining a content item label distribution associated with a content item, wherein the content item label distribution comprises a plurality of second labels of the plurality of event labels; and
   sending, based on comparing the event label distribution with the content item label distribution, the content item to the user device.

2. The method of claim 1, wherein determining the one or more textual labels further comprises:
   determining, based on a first semantic similarity associated with the received event type, one or more keywords; and
   determining, based on a second semantic similarity associated with each of the one or more keywords, one or more textual event labels.

3. The method of claim 1, wherein determining the content item label distribution further comprises determining, based on visually detecting objects associated with one or more second images associated with the content item, the content item label distribution.

4. The method of claim 3, wherein each one of the second images comprises one or more frames of a video associated with the content item.

5. The method of claim 4, wherein the one or more frames are selected at a specified interval throughout at least a portion of the video.

6. The method of claim 1, wherein determining the event label distribution further comprises scaling at least one of the one or more visual event labels or the one or more textual event labels.

7. The method of claim 1, further comprising determining, based on the comparing the event label distribution and the content item label distribution, a relevance score, wherein determining the relevance score comprises comparing a similarity of the first labels associated with the event label distribution to the second labels associated with the content item label distribution.

8. The method of claim 7, wherein generating the relevance score further comprises scaling one or more of the first labels or one or more of the second labels based on a popularity score associated with the one or more first labels or the one or more second labels.

9. The method of claim 8, wherein the popularity score and the scaling are inversely correlated.

10. A method comprising:
    determining, by an event detector, an event type associated with a content item presented at a user device;
    determining, based on visually detecting objects associated with one or more images associated with the content item, one or more visual event labels, of a plurality of event labels associated with the event detector, associated with the event type, wherein each one of the plurality of event labels may be associated with at least one of a visual event label or a textual event label;

determining, based on a first similarity associated with the event type, one or more keywords associated with the event type;

determining, based on a second similarity associated with the one or more keywords, one or more textual event labels, of the plurality of event labels, associated with the one or more keywords;

determining, based on correlating the one or more visual event labels and the one or more textual event labels, an event label distribution associated with the event type, wherein the event label distribution comprises a plurality of first labels, of the plurality of event labels;

determining, based on visually detecting objects associated with one or more images associated with a video, a video label distribution associated with the video, wherein the video label distribution comprises a plurality of second labels, of the plurality of event labels; and determining, based on comparing the event label distribution with the video label distribution, a relevance score.

11. The method of claim 10, further comprising sending, based on determining the relevance score is greater than a threshold relevance score, the video to the user device.

12. The method of claim 10, wherein determining the event label distribution further comprises scaling at least one of the one or more visual event labels or the one or more textual event labels.

13. The method of claim 10, wherein generating the relevance score further comprises scaling one or more of the first labels or one or more of the second labels based on a popularity score associated with at least one of the one or more first labels or at least one of the one or more second labels.

14. The method of claim 10, wherein each one of the one or more images comprises one or more frames of a video associated with the content item.

15. The method of claim 14, wherein the one or more frames are selected at a specified interval throughout at least a portion of the content item.

16. The method of claim 14, wherein the one or more frames are associated with a first segment of the video, the event label distribution is a first event label distribution associated with the first segment, and the video is a first video, further comprising:

determining a second segment of the video presented at the user device;

determining a second event label distribution associated with the second segment;

determining, based on comparing the second event label distribution with a second video label distribution associated with a second video, a second relevance score; and sending, based on determining the relevance score is greater than a threshold value, the second video to the user device.

17. A method comprising:

determining, based on visually detecting objects associated with one or more images associated with a content item, one or more visual event labels, of a plurality of event labels, associated with the content item;

determining, based on the one or more visually relevant event labels, a content item label distribution associated with the content item, wherein the content item label distribution comprises one or more first labels of the plurality of event labels;

receiving, from a computing device, a request for content comprising one or more second labels of the plurality of event labels;

determining, based on comparing the content item label distribution and the one or more second labels, a relevance score; and sending, to the computing device and based on determining the relevance score is greater than a threshold value, the content item.

18. The method of claim 17, wherein determining the content item label distribution further comprises determining a label relevance score associated with each one of the one or more first labels.

19. The method of claim 18, wherein the content item label distribution comprises at least one of the one or more first labels with a threshold label relevance score.

20. The method of claim 19, wherein the relevance score is a first relevance score and wherein sending the content item further comprises:

determining, based on comparing the one or more second labels and one or more third labels associated with a second content item, a second relevance score; and determining, based on the first relevance score being greater than the second relevance score, to send only the first content item to the computing device.

21. The method of claim 17, wherein generating the relevance score further comprises scaling one or more of the first labels or one or more of the second labels based on popularity scores associated with each one of the one or more first labels or the one or more second labels.

22. The method of claim 21, wherein the popularity score and the scaling are inversely correlated.

* * * * *